Nov. 29, 1949  L. B. CHERRY  2,489,999
RECALIBRATING MOTOR CONTROL SYSTEM
Filed Dec. 7, 1946  2 Sheets-Sheet 1

*INVENTOR.*
LLOYD B. CHERRY
BY Arthur H. Swanson
ATTORNEY

Nov. 29, 1949     L. B. CHERRY     2,489,999
RECALIBRATING MOTOR CONTROL SYSTEM
Filed Dec. 7, 1946     2 Sheets-Sheet 2

INVENTOR.
LLOYD B. CHERRY
BY Arthur H. Swanson
ATTORNEY

Patented Nov. 29, 1949

2,489,999

UNITED STATES PATENT OFFICE 2,489,999

RECALIBRATING MOTOR CONTROL SYSTEM

Lloyd B. Cherry, Beaumont, Tex., assignor, by mesne assignments, to Minneapolis-Honeywell Regulator Company, Minneapolis, Minn., a corporation of Delaware Application December 7, 1946, Serial No. 714,695

15 Claims. (Cl. 318—28)

1

The present invention relates to self-balancing measuring and control apparatus including a measuring circuit-network and recalibrating and rebalancing mechanisms, and one general object of the present invention is to provide such apparatus with simple and effective damping means which will permit each recalibrating and each rebalancing operation to be effected with desirable rapidity and accuracy and without over-travel due to mechanism inertia. Another general object of the invention is to provide damping means which will also produce a safe failure action on a break in the measuring circuit. A further object of the invention is to provide and arrange damping means effective to minimize the injurious effects of stray potentials on the sensitivity and performance of the recalibrating operations.

In the preferred form of the present invention the recalibrating and rebalancing mechanisms are each actuated by a reversible motor which may operate at a relatively high speed in each operation, except during a final portion of the operation in which the motor is slowed down or damped to avoid over-travel at the conclusion of the operation. In some cases, the same motor may be used as the common actuating member of the calibrating and rebalancing mechanisms. In other cases, each of said mechanisms is provided with an individual actuating motor.

The present invention was primarily devised for use in self-balancing measuring apparatus of the well known type comprising a null type potentiometer bridge circuit and a switch mechanism operable to alternately connect, between respectively appropriate points of the bridge circuit, a measuring circuit branch including a thermocouple or other source of voltage to be measured and a standardizing or recalibrating circuit branch including a standard cell. A primary object of the present invention is to combine, with the above mentioned switch mechanism, simple and effective means through which the actuation of the switch mechanism to operatively connect to the bridge circuit either the source of voltage to be measured, or the standard cell, will so operatively connect delay means, comprising resistance and reactance, into the circuit network that in the recalibrating operation or rebalancing operation initiated by such switch actuation, the rotation of the actuating motor will be terminated as soon as standardization or rebalance is respectively attained. In ordinary practice, the delay means employed comprises a condenser which the switch mechanism connects in parallel

2 with the measuring branch or with the calibration branch when operated to adjust the apparatus into its measuring condition or its standardizing condition, respectively. For the attainment of the desired damping action, each of the measuring and standardizing circuit branches must include the resistance needed to give a suitable time constant to the circuit which is formed when that branch and the damping condenser are connected in parallel.

For the attainment of the safe failure action in the event of a break in the measuring circuit, the condenser connection which I employ to produce damping effects in the recalibrating and rebalancing operations must be of a character to provide a high resistance path of flow for direct current. With such a condenser connected in parallel with the measuring branch, when the latter is connected to the bridge circuit and is in a broken condition, the D. C. current flow through the condenser connection will actuate the rebalancing motor for operation in a manner indicative of the inoperative condition of the measuring circuit branch. To provide the high resistance or low conductivity flow path for direct current, the condenser connection may include an electrolytic condenser through which a minute D. C. current will leak. Alternatively, in lieu of an electrolytic condenser, I may employ a dry, non-leaky condenser with a suitable high resistance connected in parallel with the condenser. The manner in which the condenser, provided to damp the recalibrating mechanism in accordance with the present invention, operates as a bypass to minimize the objectionable effects of 60 cycle stray currents picked up from external sources is hereinafter explained.

The various features of novelty which characterize my invention are pointed out with particularity in the claims annexed to, and forming a part of this specification. For a better understanding of the invention, however, its advantages and specific objects attained by its use, reference should be had to the accompanying drawing and descriptive matter in which I have illustrated and described preferred embodiments of the invention.

Figures 1, 1A, 2:
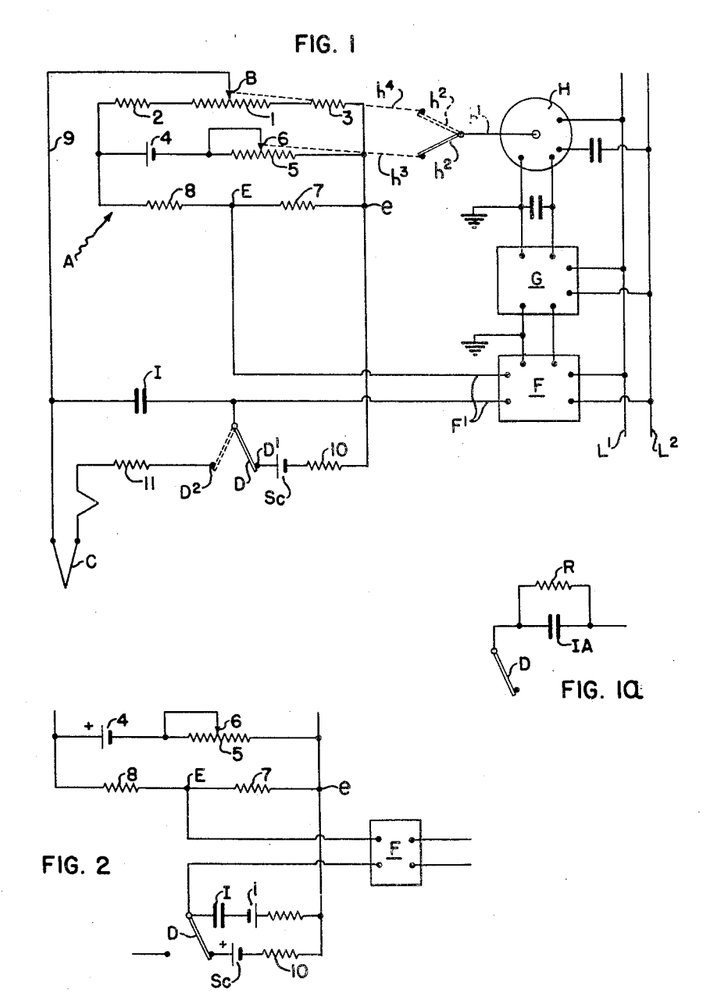
Fig. 1 is a diagram illustrating one embodiment of the present invention.
Fig. 1a illustrates a modification of a portion of the circuit network shown in Fig. 1.
Fig. 2 is a diagram illustrating the operation of a portion of the circuit shown in Fig. 1.

The embodiment of the invention illustrated by way of example in Fig. 1 includes a circuit network comprising a null type, split potentiometer circuit A of conventional design, comprising three branches. One of those branches includes a slide wire resistance 1 interposed between resistances 2 and 3 and engaged by a slider contact B adjustable along the length of the resistance 1. A second branch of the bridge circuit includes a bridge energizing battery or other source of voltage 4 and an adjustable resistance 5, and the third branch of the bridge circuit includes a recalibrating resistance 7 and a resistance 8 in series with the resistance 7, and connected to the latter at E. More or less of the resistance 5 is operatively included in the bridge circuit, depending upon the adjustment of an adjustable shunt including a contact 6 engaging and adjustable along the resistance 5. The recalibration operation comprises the adjustment of the contact 6 as required to maintain a current flow through the battery 4, which will produce predetermined potential drops in the different fixed resistances in the bridge circuit.

The circuit network shown in Fig. 1 also comprises a recalibrating or standardizing circuit branch and a measuring circuit branch. The standardizing branch shown in Fig. 1 includes a standard cell Sc and a resistance 10 connected in series between the bridge circuit point $e$ to which the terminal of the calibrating resistance 7, remote from the point E, is connected, and a stationary switch contact D'. The measuring circuit branch includes a thermocouple C, a conductor 9 which connects one terminal of the thermocouple C to the slider contact B, and a resistance 11 connecting the second terminal of the thermocouple to a stationary switch contact $D^2$. The contacts D' and $D^2$ form part of a switch mechanism comprising a pivoted switch member D. The latter has two operative positions, namely, a recalibrating position in which it engages the contact D', and a rebalancing position in which it engages the contact $D^2$. The switch member D is connected to one of the input circuit terminals F' of an electric current flow responsive or detection element F which has its second input circuit terminal connected to the bridge circuit at the point E at which the resistances 7 and 8 are connected.

When the switch member D occupies its recalibrating position, shown in full lines in Fig. 1, in which it engages the contact D', the standard cell Sc and resistance 10 are included in a shunt to the calibrating resistance 7. When the bridge circuit is properly calibrated, the potential drop in the resistance 7 is equal to, and in bucking relation with, the voltage of the standard cell Sc, and there is then no current flow in the input circuit of the element F. When the switch D is in its rebalancing position, shown in dotted lines in Fig. 1, in which it engages the contact $D^2$, the thermocouple C and resistance 11 are connected in series between the point E of the bridge circuit and the point along the slide wire resistance 1 engaged by the contact B. In the balanced condition of the apparatus the potential difference between bridge point E and contact B is equal to the opposing voltage of the thermocouple C and there is no current flow in the input circuit of the element F.

In the arrangement shown in Fig. 1, current flow in the input circuit of the element F operates through control apparatus G to actuate a reversible motor H for operation in a direction dependent on the direction of the current flow. When the switch member D is in engagement with the contact D', current flow through the input circuit of the device F indicates that the bridge circuit is not properly calibrated, and the motor H then operates through a mechanical connection, shown diagrammatically as including elements $h'$, $h^2$ and $h^3$, to adjust the slider contact 6 in the direction and to the extent required to recalibrate the bridge circuit. Similarly, when the switch member D is in engagement with the stationary contact $D^2$, current flow through the input circuit of the element F indicates that the measuring system is unbalanced and the motor H then operates through a mechanical connection, including elements $h'$, $h^2$ and $h^4$, to adjust the contact B, engaging the slide wire resistance 1, along the latter in the direction and to the extent required to rebalance the measuring system and thereby interrupt current flow through the input circuit of the element F.

Insofar as above described, the apparatus shown in Fig. 1, is well known and is a typical example of apparatus of the kind which it is the object of the present invention to improve. The detection element F, control apparatus G and control mechanism H may be of various known or suitable forms. In particular they may be and are herein assumed to be, of the type employed in the conversion type potentiometer now in general use in this country. In that potentiometer the element F is a converter which utilizes unidirectional current flow in its input circuit to create an alternating current signal which it impresses on the apparatus G, and the latter is an electronic voltage amplifying and motor drive system supplying current to the control winding of the motor H. The latter has a power winding also, which is connected to conductors L' and $L^2$ supplying alternating current of commercial frequency and voltage, for example, 60 cycles per second and 115 volts. The control and power windings of a motor H are shown diagrammatically in Fig. 3.

When the apparatus G supplies current to the control winding, that winding and the power winding cooperate to create a magnetic field which rotates in one direction or the other and correspondingly revolves the rotor of the motor. The direction in which said magnetic field rotates depends upon the direction of current flow in the input circuit of the element F. This results from the fact that the alternating signal impressed on the control apparatus G by the element F is approximately in phase with the voltage across the supply conductors L' and $L^2$, or is 180° out of phase with that voltage, accordingly as the current flow in the input circuit of the element F is in one direction or the other.

The conversion type potentiometer is disclosed and claimed in the application of Walter P. Wills, Serial No. 421,173, filed December 1, 1941, which issued as Patent No. 2,423,540 on July 8, 1947, and is also disclosed in the Wills Patent No. 2,385,481, of September 5, 1945, and further references herein to the form and operation of the means diagrammatically illustrated for controlling the operation of the motor H are therefore unnecessary.

Overtravel of the motor H of Fig. 1 in each of its recalibrating operations, as well as in each of its rebalancing operations, is prevented in accordance with the present invention by the connection of a condenser I of suitable capacity in the circuit network between the switch member D and the conductor 9. With the condenser I thus connected in the circuit network and with the switch member D in engagement with the contact D', the condenser I is connected in shunt to the recalibrating resistance 7, and in shunt to the recalibration circuit branch including the standard cell Sc and the resistance 10. The shunt circuit then established includes the resistance 3 and the portion of the resistance 1 at the right of the contact B. When the switch member D engages the contact D², the condenser I is connected in shunt to the portion of the bridge circuit including the resistances 8 and 2 and the portion of the resistance 1 at the left of the contact B, and in shunt to the measuring circuit branch including the thermocouple C and resistance 11.

For the purposes of the present invention, the capacity of the condenser I and the magnitudes of the resistances 10 and 11, should be chosen and related to insure that the condenser I will charge or discharge, during each recalibrating or rebalancing operation, at a rate suitably related to the inertia of the motor H. Furthermore, the resistance 10 should be substantially larger than the resistance 7, and the resistance 11 should be substantially larger than the sum of the resistance 8 and 2 and the portion of the resistance 1 at the left of the contact B. When the voltage of the standard cell Sc or of the thermocouple C then included in the circuit network differs from the voltage between the bridge circuit points to which the circuit branch including said cell or thermocouple is connected, the condenser I charges or discharges at a rate dependent upon the capacity of the condenser and upon the amount of resistance then included in the condenser charging or discharging circuit, as well as upon the voltage difference. The resistance 10 or 11 then connected in series with the condenser I reduces the condenser charging or discharging current, and thereby delays the application of the full effect of the above mentioned voltage difference to the control winding of the motor H. Such delay action is increased or decreased by respectively increasing or decreasing the rate at which the condenser I charges or discharges.

Overtravel of the motor, due to its inertia, is avoided when the retarding action of the condenser I results in such attenuation or reversal of the current in the control winding of the motor H, during the final portion of each recalibrating or rebalancing operation, as to retard the motor so that the motor inertia will not prevent the motor from stopping at the instant at which the recalibrating or rebalancing operation is completed and current flow in the input circuit of the element F is interrupted.

In explanation of the motor damping action, it is to be noted that when the switch D is adjusted into its full-line position to initiate a recalibrating operation, the existing condenser charge, and hence the condenser E. M. F., will ordinarily differ from the E. M. F. of the standard cell Sc and from the potential drop in, or E. M. F. of, the calibrating resistance 7. Ordinarily, on the initiation of a recalibrating operation, the E. M. F. of resistance 7 will be smaller than the standard cell E. M. F., since recalibration of a potentiometer bridge circuit is ordinarily required as a result of the progressive decrease in the voltage of the energizing battery as the latter ages.

When the condenser E. M. F. and standard cell E. M. F. are different, their equalization requires a flow of a condenser charging or discharging current between the terminals of the cell Sc and condenser I. That current is kept small by the resistance 10 which thus delays the equalization, and complete equalization cannot be effected until current ceases to flow between the condenser and standard cell through the resistance 10, and until such equalization is effected the recalibrating action is incomplete.

There is no delay element or action in the circuit through which the condenser E. M. F. and the E. M. F. of the resistance 7 are opposed. In consequence, current flow between the resistance 7 and the condenser I quickly gives the condenser I an E. M. F. intermediate the E. M. F. of the standard cell and the E. M. F. of the resistance 7. The current flow between the resistance 7 and condenser I results in a prompt response by the detector element F and prompt energization of the motor H for operation in the direction required to recalibrate the bridge circuit.

The current flow through the input circuit of the detector element F results from the difference between the E. M. F. of resistance 7 and the E. M. F. of the standard cell Sc, but the magnitude of said current flow depends upon the difference between the E. M. F. of the resistance 7 and the condenser E. M. F. In consequence, as the recalibrating operation proceeds and the difference between the E. M. F. of resistance 7 and the condenser E. M. F. diminishes, the operating current in the control winding of the motor H is reduced. In some cases that current may be temporarily interrupted or even reversed before recalibration is effected. Such interruption or reversal does not ordinarily interrupt the rotation of the motor, owing to the inertia of the latter. However, until the E. M. F. of resistance 7 becomes equal to the E. M. F. of the cell Sc, the condenser E. M. F. will continue to vary in the direction needed to make it equal to the standard cell E. M. F. During the final portion of the recalibrating operation, the difference between the various E. M. F.'s is reversed in polarity, and, consequently, the motion of the motor H is retarded. In consequence, if the apparatus is properly designed in accordance with the principles of the present invention, the motor will be retarded immediately prior to the attainment of complete recalibration so that it will have no inertia tendency to overtravel, and will stop as soon as recalibration is attained and interruption of the supply of motor driving current to the control winding of the motor H is effected.

In rebalancing operations, the E. M. F. of the condenser I is related to the E. M. F. of the thermocouple C and to the potential drop in, or E. M. F. of, the portion of the bridge circuit including the resistance 8, resistance 2 and the portion of the resistance 1 at the left of the contact B, as the E. M. F. of condenser I is respectively related to the E. M. F. of the standard cell Sc and the E. M. F. of the resistance 7 in recalibrating operations. The condenser I and resistance 11 cooperate to damp the rebalancing operation of the motor H in substantially the same manner in which the condenser I and resistance 10 cooperate to damp the recalibrating operation of the motor H. It is to be noted, however, that in the rebalancing operation each of the three related E. M. F.'s may vary during the rebalancing operation, whereas in the recalibrating operation the E. M. F. of the standard cell Sc is constant. In rebalancing, the E. M. F. of the potentiometer resistances between the point E and contact B is varied by adjustment of the latter along the slide wire resistance 1, generally as the E. M. F. of the resistance 7 is varied in the recalibrating operations by the adjustment of the contact 6 along the resistance 5.

In the recalibration of the apparatus with the switch D in engagement with the contact D', the condenser I is included in a circuit branch which forms a shunt to the resistor 7, and a shunt to the recalibrating circuit branch which includes the standard cell Sc and resistance 10. As shown in Fig. 1, the shunt circuit branch includes, in series with the condenser I, the resistance 3 and the portion of the resistance 1 at the right of the contact B. For purposes of the present invention, the adjustment position of the contact B along the relatively small resistance 1 during the recalibration operation is practically unimportant. The effect of the potential drop in the fixed resistance 3 and the portion of the resistance 1 at the right of the contact B during a recalibrating operation is analogous to that which would be obtained by connecting a dry cell $i$ of suitable voltage in series with the condenser I between the switch member D and bridge point $e$, as is illustrated in Fig. 2. The voltage of the cell $i$ of Fig. 2 is assumed to be equal to the collective potential drop in the resistances 1 and 3 between the contact B and point $e$.

The last mentioned potential drop, as Fig. 2 plainly indicates, reduces the potential drop across the condenser I during each recalibration operation and correspondingly reduces the charging or discharging current of the condenser I produced by a given difference between the standard cell Sc E. M. F. and the E. M. F. of the resistance 7. However, the reduction in the E. M. F. of the condenser I due to the potential drop in the bridge circuit, which is represented in Fig. 2 by the cell $i$, does not change the character of the motor damping action resulting from the condenser charging or discharging action occurring during the recalibrating operation. Insofar as the reduction in the condenser E. M. F. tends to reduce the condenser charging or discharging current, it tends to reduce the magnitude of the damping action, but the effect on the magnitude of the damping action of a reduction in the effective voltage across the condenser I may be substantially compensated for by increasing the capacity of the condenser I.

During the recalibrating operation, the condenser connected in parallel with the recalibration circuit branch serves a useful purpose in preventing any stray, 60 cycle alternating current, picked up from an extraneous source, from being amplified in the amplifying system through which the motor effecting the calibration is controlled. The amplification of such a stray current in the motor controlling amplifying system is objectionable. Even though its phase be such that it results in little or no motor drive action, it does reduce the sensitivity of the amplifier to a variable extent, depending on the magnitude and character of the stray current.

For maximum accuracy of standardization, it is essential that the amplifier system sensitivity be kept within relatively narrow limits, and suitably related to the physical characteristics of the resistance 5 adjusted to regulate the bridge energizing circuit. Customarily, in commercial apparatus of the type under consideration, the resistance 5 comprises a multiplicity of resistance wire convolutions, and is adjusted by cutting convolutions one at a time into or out of the bridge energizing circuit. The overall sensitivity of the apparatus should be high enough to provide a slow motor drive on a recalibration unbalance of one resistance convolution, and should be low enough to avoid the oscillation or hunting which the cutting of a resistance convolution into or out of the energizing circuit will produce if the overall sensitivity is increased only slightly beyond the value required to produce the desired slow motor drive for an unbalance of one convolution.

The proper control of the sensitivity maintained in the recalibration operation is complicated by the fact that the gain control of the amplifier must be fixed at the value at which the apparatus will perform the measuring operation properly at the desired millivolt or temperature range. Ordinarily the amplifier gain must be set at a lower value when the apparatus is arranged to measure values varying through a wide span or range than when the apparatus is arranged to measure values varying through a narrower span or range. Since the amplifier gain found appropriate for measuring purposes must remain fixed during the standardizing operations, any reduction in overall sensitivity during standardization periods must be accomplished externally of the amplifier and by some means that will be ineffective except during standardization. It is possible to reduce the sensitivity of the amplifying system by the use of a shunt to said system, but the effective use of such a shunt requires an additional contact on the standardization switch. The addition of resistance in series with the standard cell will also reduce sensitivity, and has the additional advantage of reducing the current drawn from the standard cell during the standardizing operation, but resistance in series with the standard cell increases the stray pickup.

The objections just noted are avoided by the use of the described condenser connection in shunt to the calibration circuit branch, which significantly reduces the effective amplifier sensitivity during recalibration, and causes stray 60 cycle signals to be bypassed.

The values for the resistances 10 and 11 may well be dependent upon other resistance values in the circuit network, as well as on the capacity of the condenser I. Such other resistance values may vary through a considerable range as a result of variations in bridge circuit design and in the conditions of operation. By way of illustration and example, and not by way of limitation, it is noted that in one typical bridge circuit of the type and form shown in Fig. 1, the various resistances have values as follows:

| Resistance | 1 = | 11.94 | ohms |
|---|---|---|---|
| Resistance | 2 = | 1.979 | ohms |
| Resistance | 3 = | 243.2 | ohms |
| Resistance | 5 = | 105.0 | ohms |
| Resistance | 7 = | 509.5 | ohms |
| Resistance | 8 = | 5.255 | ohms |
| Resistance | 10 = | 5000.0 | ohms |
| Resistance | 11 = | 150.0 | ohms |

With the bridge circuit resistance values just stated, the condenser I may well have a capacity of 500 microfarads and the resistance 10 may well vary between 1500 ohms in wide scale range operations of the potentiometer, and 7500 ohms for narrow scale range operations, and may have intermediate values for operations with an intermediate scale range. As those skilled in the art understand, the scale range of a potentiometer of the type shown in Fig. 1 is a function of the change in the thermocouple voltage or other voltage being measured which is required to effect movement of the contact B from one end to the other of its range of movement along the slide wire resistance. The scale range may be varied by varying the resistance value of the slide wire resistance 1, but ordinarily is effected by other variations in bridge circuit resistance values, as is well known to those skilled in the art.

Figure 3:
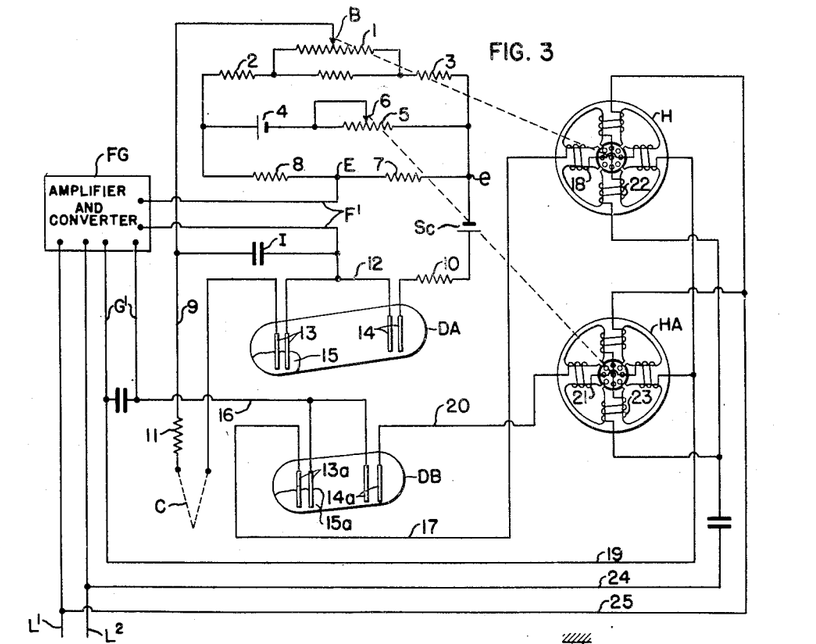
Fig. 3 is a diagram illustrating a second embodiment of the invention including separate balancing and calibrating motors.

In some cases it is desirable to provide separate, reversible motors for the rebalancing and recalibrating operations in self-balancing measuring apparatus embodying the present invention, and one such arrangement is illustrated in Fig. 3, wherein H is the rebalancing motor and HA is the recalibrating motor. Each of the motors H and HA of Fig. 3 may be exactly like the motor H of Fig. 1. The circuit network shown in Fig. 3 is essentially the same as that illustrated in Figs. 1 and 2, except for the substitution of a mercury switch DA, for switch D of Fig. 1, and for the addition of a separate motor HA for adjusting the regular contact 6 of Fig. 3, and for the addition of a switch DB which is adjusted into a position to energize the recalibrating motor HA or the rebalancing motor H, when the switch DA is adjusted into its recalibrating position or into its rebalancing position, respectively.

In Fig. 3, the device FG includes the elements F and G of Fig. 1 and performs the function of both of these elements. Its input terminals F' are connected one to the bridge point E and the other to a conductor 12, which is connected to one of the pair of contacts or electrodes 13 extending into the envelope or body of the switch DA at the left end, and to one of the pair of contacts or electrodes 14 extending into the switch envelope at its right end. The two contacts 13 coact with the body of mercury 15 in the switch DA to connect the thermocouple C and resistance 11 between the contact B and the bridge point E when the switch DA occupies its rebalancing position shown in Fig. 3. When the switch DA is tilted into its recalibrating position so that the mercury 15 moves from the left end to the right end of the switch envelope, the contacts 14 then connect the adjacent end of the resistance 10 to the bridge point E, so that the standard cell Sc is then connected in shunt to the bridge circuit resistance 7. In Fig. 3 the condenser I is connected between the conductor 9 and the conductor 12. The condenser I is thus operatively connected in the network of Fig. 3 in each of the two operative positions of the switch DA, just as the condenser I is operatively connected in the network of Fig. 1, accordingly as the switch D is in its recalibrating or in its rebalancing position.

Figure 4:
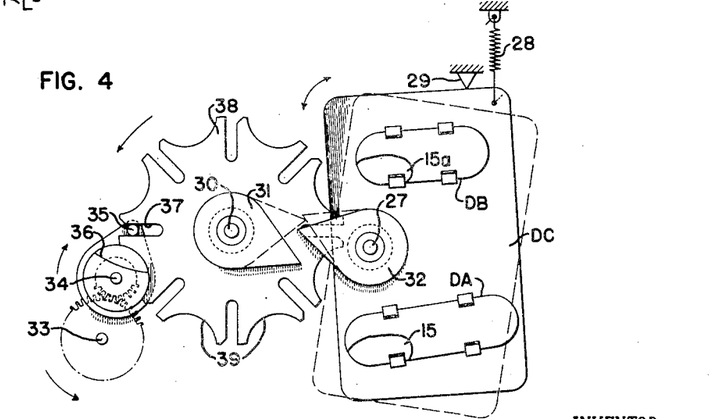
Fig. 4 is an elevation of switch actuating mechanism adapted for use in the form of the invention shown diagrammatically in Fig. 3.

The mercury switch DB may be a counterpart of the switch DA, though preferably the two switches are relatively proportioned and arranged as shown in Figs. 3 and 4, so that when the two switches are simultaneously adjusted to change from the potentiometric measuring operation to the potentiometer standardizing operation, the rebalancing motor H will be disconnected from and the standardizing motor HA will be connected to the output circuit of the control apparatus FG before the potentiometric circuit has been adjusted into its standardizing condition. This prevents the apparatus from giving false movements to the recording pen or to control apparatus which, while not shown, is ordinarily included in potentiometric apparatus of the type disclosed, and is given adjustments by the rebalancing motor simultaneously with the adjustments which that motor gives to the slider contact B.

When the position of the switch DB is such that the mercury body 15a connects the contacts 13a at the left end of the switch, and thereby connects the conductors 16 and 17, the control winding 18 of the rebalancing motor H has one terminal connected through the switch DB to the right-hand output terminal G' of the control apparatus FG. The second terminal of the winding 18 is shown as being permanently connected by a conductor 19 to the left-hand output terminal G'. When the switch DB is shifted to move the mercury 15a into the right end of the switch envelope, the contacts 14a connect the conductor 16 to a conductor 20, and thereby connect one terminal of the control winding 21 of the recalibrating motor HA to the right-hand output terminal G' of the control apparatus FG. The second terminal of the winding 21 is permanently connected by the conductor 19 to the left-hand output terminal G' of the apparatus FG. The power windings 22 and 23 of the motors H and HA, respectively, are connected in parallel between the branches 24 and 25 of the supply conductors L' and L².

For the general purposes of the present invention, the switch D of Fig. 1 and the switches DA and DB of Fig. 3 may be manually adjusted to effect recalibrating operations at the will of the operator, or they may be automatically adjusted to effect recalibrating operations at predetermined intervals. One arrangement for automatically effecting recalibration at predetermined time intervals is illustrated in Fig. 4, wherein the switches DA and DB of Fig. 1 are mounted on a support DC secured to a shaft 27 for oscillation between a rebalancing position and a recalibrating position shown in full and dotted lines, respectively, in Fig. 4. In the rebalancing position of the switch support DC, the mercury body in each switch is at the left-hand end of the latter, and in the recalibrating position of the support DC, the mercury is at the right-hand end of each switch. As shown, a bias spring 28 tends to hold the support DC in its rebalancing position in which it engages a stop 29.

During a short portion of each of intermittent rotative movements of a shaft 30, a cam lever 31, carried by the shaft 30, engages a cam part 32 rigidly secured to the switch support DC, and thereby oscillates the latter from its full line position into its dotted line position shown in Fig. 4. The cam parts 31 and 32 are so shaped and arranged that as the rotative movement of the shaft 30 continues, said parts separate and permit the switch support DC to turn back into its full line position a few seconds after the switch member has been moved into its dotted line position. As shown, the shaft 30 is intermittently rotated at suitably frequent intervals and with suitable rapidity, by a slow-speed, continuously rotating shaft 33 which acts on the shaft 30 through a Geneva stop motion shown as comprising the intermediate shaft 34 which is gear-connected to the shaft 33 and carries a crank pin 35 and a notched disc 36. The crank pin 35 is adapted to successively move into and out of the different radial slots 37 formed in a disc or wheel element 38 carried by the shaft 30.

During the portion of each rotation of the shaft 34 in which the crank pin 35 is received in a corresponding radial slot 37 in the wheel or disc 38, the latter is angularly advanced through a fraction of a revolution. The magnitude of the fraction depends upon the number of radial slots 37 in the wheel 38. As shown, there are eight equally spaced radial slots 37 in the wheel 38 and the latter is given one-eighth of a turn for each revolution of the shaft 34. During periods in which crank pin 35 is not in operational engagement with the walls of a slot 37, the wheel or disc 38 is held against rotation by the engagement of the unnotched peripheral portion of the disc 36 with the corresponding concave edge portion 39 of the wheel 38, there being one such concave portion between the outer ends of each two adjacent radial slots 37. The disc 36 is cut away or notched to permit angular movement of the wheel member 38 while the crank pin 35 is operatively received in a radial slot 37. In an ordinary recording potentiometer the shaft 33 may be a chart-advancing roll shaft, or may be some other shaft rotated at slow but constant speed by the chart driving motor. While the mechanism shown in Fig. 4 for tilting the switch carrier DC is well adapted for that purpose, other mechanisms may be employed for the same purpose.

The apparatus disclosed herein comprises relatively simple and effective means for damping both the rebalancing and recalibrating operations of measuring apparatus having the same automatic rebalancing and recalibrating mechanism and is believed to be the first such apparatus including provisions for damping both operations. While the invention in its broader aspects is not restricted to the use of a single condenser, as a damping element both for rebalancing and recalibrating operations, the use illustrated of a single condenser contributes to apparatus simplification. In addition to its damping properties, the condenser I prevents interference with the normal operation of the measuring apparatus by stray alternating currents which might otherwise be picked up and amplified and produce faulty motor operation. When connected into the circuit network in either the recalibrating or rebalancing condition of the apparatus, the condenser I forms an effective filter for preventing the passage of stray currents through the amplifying system.

As will be apparent to those skilled in the art, the present invention may be used to advantage in self-balancing measuring apparatus employed for all of the various measuring, recording and control purposes for which self balancing potentiometers, and particularly self balancing recording potentiometers, are adapted.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Potentiometric measuring apparatus comprising in combination, a bridge circuit including a slide wire resistance, a calibrating resistance having a pair of terminals and energizing means connected to both of said resistances and operative to produce an energizing current flow through said resistances, said energizing means including a regulator adjustable to vary the energizing current flow through said resistances, a standardizing circuit branch including a source of standard voltage and a resistance larger than said calibrating resistance, a condenser, means connecting said condenser and said circuit branch in parallel between the terminals of said calibrating resistance, and means responsive to current flow between said condenser and said calibrating resistance for adjusting said regulator in the direction to eliminate such current flow.

2. In self-balancing potentiometric measuring apparatus, the combination with a bridge circuit including a slide wire resistance having a slider contact, a calibrating resistance having two terminals and energizing means connected to both of said resistances and operative to produce an energizing current flow through said resistances, said energizing means including a regulator adjustable to vary the energizing current flow through said resistances, of a measuring circuit branch including a source of voltage to be measured and a resistance and having two terminals, one of which is connected to said slider contact, a calibrating circuit branch including a source of standard voltage and a resistance and having one terminal connected to two terminals, one of which is of said calibrating resistance, a condenser having one terminal connected to said slider contact and having its second terminal connected to the second terminal of said calibrating resistance, and switch means operable to connect the second terminal of either one or the other of said circuit branches to the second terminal of said calibrating resistance.

3. In self-balancing potentiometric measuring apparatus, the combination with a bridge circuit including a slide wire resistance having a slider contact, a calibrating resistance having two terminals, and energizing means connected to both of said resistances and operative to produce an energizing current flow through said resistances, said energizing means including a regulator adjustable to vary the energizing current flow through said resistances, of a measuring circuit branch including a source of voltage to be measured and a resistance and having two terminals, one of which is connected to said slider contact, a calibrating circuit branch including a source of standard voltage and a resistance and having two terminals, one of which is connected to one terminal of said calibrating resistance, a condenser having one terminal connected to said slider contact and having its second terminal connected to the second terminal of said calibrating resistance, switch means operable to connect the second terminal of either of said circuit branches to the second terminal of said calibrating resistance without connecting the last mentioned terminal to the second terminal of the other of said circuit branches, and means responsive to current flow between the second terminals of said calibrating resistance and condenser for adjusting said regulator to prevent such current flow.

4. In self-balancing potentiometric measuring apparatus, the combination with a bridge circuit including a slide wire resistance having a slider contact, a calibrating resistance having two terminals, and energizing means connected to both of said resistances and operative to produce an energizing current flow through said resistances, said energizing means including a regulator adjustable to vary the energizing current flow through said resistances, of a measuring circuit branch including a source of voltage to be measured and a resistance and having two terminals, one of which is connected to said slider contact, a calibrating circuit branch including a source of standard voltage and a resistance and having two terminals, one of which is connected to one terminal of said calibrating resistance, a condenser having one terminal connected to said slider contact and having its second terminal connected to the second terminal of said calibrating resistance, switch means operable to connect the second terminal of either of said circuit branches to the second terminal of said calibrating resistance without connecting the last mentioned terminal to the second terminal of the other of said circuit branches, means responsive to current flow between the second terminals of said calibrating resistance and calibrating branch for adjusting said regulator to prevent such current flow, and means responsive to current flow between the second terminals of said calibrating resistance and measuring branch for adjusting said slider contact to prevent the last mentioned current flow.

5. Self-balancing measuring apparatus comprising a bridge circuit including a slide wire resistance, a calibrating resistance having two terminals and energizing means connected to both of said resistances and operative to produce an energizing current flow through said resistances, said energizing means including a current regulator, a slider contact engaging and adjustable along said slide wire resistance, a flow responsive device having two terminals one of which is connected to one terminal of said calibrating resistance, a standardizing circuit branch including a standard cell and a resistance and having two terminals, one of which is connected to the second terminal of said calibrating resistance, a measuring circuit branch including a resistance and a source of voltage to be measured and having two terminals, one of which is connected to said slider contact, switching means operable to connect the second terminal of said flow responsive device interchangeably to the second terminal of said standardizing branch and to the second terminal of said measuring branch, a recalibrating motor controlled by and operating in selective accordance with the current flow through said device to adjust said regulator when said standardizing branch is connected to said flow responsive device, a rebalancing motor controlled by and operating in selective accordance with the current flow through said device to adjust said slider contact when said measuring branch is connected to said device, and a damping condenser adjusted by said switching means into damping relation with the recalibrating motor when the standardizing circuit branch has its second terminal connected to the second terminal of said device, and into damping relation with the rebalancing motor when the measuring branch has its second terminal connected to the second terminal of said device.

6. Self-balancing measuring apparatus comprising a bridge circuit including a slide wire resistance, a calibrating resistance having two terminals and energizing means connected to both of said resistances and operative to produce an energizing current flow through said resistances, said energizing means including a current regulator, a slider contact engaging and adjustable along said slide wire resistance, a flow responsive device having two terminals one of which is connected to one terminal of said calibrating resistance, a standardizing circuit branch including a standard cell and a resistance and having two terminals, one of which is connected to the second terminal of said calibrating resistance, a measuring circuit branch including a resistance and a source of voltage to be measured and having two terminals, one of which is connected to said slider contact, switching means operable to connect the second terminal of said flow responsive device interchangeably to the second terminal of said standardizing branch and to the second terminal of said measuring branch, mechanism controlled by and operating in selective accordance with the current flow through said device to adjust said regulator when said standardizing branch is connected to said flow responsive device and to adjust said slider contact when said measuring branch is connected to said device, and a damping condenser connected between said slider contact and the second terminal of said flow responsive device.

7. In self-balancing potentiometric measuring apparatus, the combination with a bridge circuit including a slide wire resistance having a slider contact, a calibrating resistance having two terminals, and energizing means connected to both of said resistances and operative to produce an energizing current flow through said resistances, said energizing means including a regulator adjustable to vary the energizing current flow through said resistances, of a measuring circuit branch including a source of voltage to be measured and a resistance and having two terminals, one of which is connected to said slider contact, a calibrating circuit branch including a source of standard voltage and a resistance and having two terminals, one of which is connected to one terminal of said calibrating resistance, a circuit branch including capacity and providing a high resistance path of flow for direct current and having one terminal connected to said slider contact and having its second terminal connected to the second terminal of said calibrating resistance, and switch means operable to connect the second terminal of either one or the other of said measuring and calibrating circuit branches to the second terminal of said calibrating resistance.

8. A self-balancing measuring apparatus combination as specified in claim 2, in which said condenser is leaky and forms a direct current flow path of low conductivity.

9. A self-balancing measuring apparatus combination as specified in claim 2, including a resistance connected in parallel with said condenser and providing a direct current flow path of low conductivity.

10. A self-balancing measuring apparatus combination as specified in claim 2, in which said switch means comprises a support mounted to oscillate about an axis between two positions, a mercury switch mounted on said support and comprising a mercury-containing envelope, a pair of contacts extending into the envelope in position to be connected by said mercury when said support occupies one of said positions, and a second pair of contacts extending into said envelope in position to be connected by the mercury in said envelope when said support occupies the second of said positions.

11. A self-balancing measuring apparatus combination as specified in claim 2, in which said switch means comprises a support mounted to oscillate about an axis between two positions, a mercury switch mounted on said support and comprising a mercury-containing envelope, a pair of contacts extending into the envelope in position to be connected by said mercury when said support occupies one of said positions, a second pair of contacts extending into said envelope in position to be connected by the mercury in said envelope when said support occupies the second of said positions, and timing means adjusting said support back and forth between said two positions at predetermined time intervals.

12. Potentiometric measuring apparatus comprising in combination, a bridge circuit including a slide wire resistance, a calibrating resistance having a pair of terminals and energizing means connected to both of said resistances and operative to produce an energizing current flow through said resistances, said energizing means including a regulator adjustable to vary the energizing circuit flow through said resistances, a standardizing circuit branch including a source of standard voltage and a resistance larger than said calibrating resistance, a condenser, a source of direct current voltage smaller than the voltage across said calibrating resistance, means connecting said condenser and source in series with one another and in parallel with said circuit branch between the terminals of said calibrating resistance, with the voltage of said source in bucking relation with the voltage across said calibrating resistance, and means responsive to current flow between said condenser and said calibrating resistance for adjusting said regulator in the direction to eliminate such current flow.

13. Self-balancing measuring apparatus comprising a bridge circuit including a slide wire resistance, a calibrating resistance having two terminals and an energizing means connected to both of said resistances and operative to produce an energizing current flow through said resistances, said energizing means including a current regulator, a slider contact engaging and adjustable along said slide wire resistance, an amplifying and motor control system having two input and two output terminals and having one of said input terminals connected to one terminal of said calibrating resistance, a standardizing circuit branch including a standard cell and a resistance and having two terminals, one of which is connected to the second terminal of said calibrating resistance, a measuring circuit branch including a resistance and a source of voltage to be measured and having two terminals, one of which is connected to said slider contact, a condenser, a recalibrating motor operable to adjust said regulator, a rebalancing motor operable to adjust said slider contact, a switch mechanism including means operable to interchangeably connect the second input terminal of said system to the second terminal of said standardizing circuit branch and to the second terminal of said measuring circuit branch, and to connect said condenser in shunt relation to said calibrating circuit branch and in shunt relation to said measuring circuit branch during the periods in which said branches are respectively connected to said second input terminal, said switch mechanism also including means operating in timed relation with the first mentioned means to connect said recalibrating motor to said output terminals when said standardizing circuit branch is connected to said second input terminal, and to connect said rebalancing motor to said output terminals when said measuring circuit branch is connected to said second input terminal.

14. Self-balancing measuring apparatus comprising a bridge circuit including a slide wire resistance, a calibrating resistance having two terminals and an energizing means connected to both of said resistances and operative to produce an energizing current flow through said resistances, said energizing means including a current regulator, a slider contact engaging and adjustable along said slide wire resistance, an amplifying and motor control system having two input and two output terminals and having one of said input terminals connected to one terminal of said calibrating resistance, a standardizing circuit branch including a standard cell and a resistance and having two terminals, one of which is connected to the second terminal of said calibrating resistance a measuring circuit branch including a resistance and a source of voltage to be measured and having two terminals, one of which is connected to said slider contact, a condenser having one terminal connected to the second input terminal of said system and having its other terminal connected to said one input terminal of said system through a portion of the bridge circuit including said calibrating resistance, a recalibrating motor operable to adjust said regulator, a rebalancing motor operable to adjust said slider contact, a switch mechanism including a pivoted support arranged for turning movement between first and second positions, two mercury switches mounted on and sharing the turning movements of said support, each mercury switch comprising an envelope and a small body of mercury movable in said envelope and including a first pair of contacts extending into the said envelope in position to be connected by the mercury body therein when said support is in its first position and a second pair of contacts extending into the envelope in position to be connected by the mercury body when said support is in its second position, means connecting one contact of each of the pairs extending into the envelope of the first switch to the said second input terminal of said system, means connecting the second contact of the first pair of contacts of the first switch to the second terminal of the measuring circuit branch, and means connecting the second contact of the second pair of contacts of the first switch to the second terminal of said calibrating branch, means through which the first pair of contacts entering the envelope of the second switch operatively connects the rebalancing motor to said output terminals when said support is in its first position, and means through which the second pair of contacts entering the envelope of said second switch connects the recalibrating motor to said output terminals when said support is in its second position.

15. Potentiometric measuring apparatus comprising in combination, a bridge circuit including a slide wire resistance, a calibrating resistance, and energizing means connected to both of said resistances and operative to produce an energizing current flow through said resistances, said energizing means including a regulator adjustable to vary the energizing current flow through said resistances, a standardizing circuit branch including a source of standard voltage and a resistance larger than said calibrating resistance, a condenser, conductor means connecting said condenser and said circuit branch to said bridge circuit so that each forms a shunt to a portion of the bridge circuit including said calibrating resistance, and means responsive to current flow between said condenser and said calibrating resistance for adjusting said regulator in the direction to eliminate such current flow.

LLOYD B. CHERRY.

REFERENCES CITED

The following references are of record in the file of this patent:

UNITED STATES PATENTS

| Number    | Name          | Date          |
|-----------|---------------|---------------|
| 1,907,093 | Shivers       | May 2, 1933   |
| 1,931,223 | Harrison      | Oct. 17, 1933 |
| 2,300,742 | Harrison et al. | Nov. 3, 1942 |
| 2,404,891 | Schmitt       | July 30, 1946 |
| 2,424,146 | Caldwell et al. | July 15, 1947 |

Certificate of Correction

Patent No. 2,489,999 November 29, 1949

LLOYD B. CHERRY

It is hereby certified that errors appear in the printed specification of the above numbered patent requiring correction as follows:

Column 9, line 32, for the word "regular" read *regulator*; column 12, lines 35, 36, and 37, strike out "one terminal connected to two terminals, one of which is" and insert instead *two terminals, one of which is connected to one terminal*; column 16, line 24, after "resistance" insert a comma;

and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*